United States Patent [19] [11] 4,378,221
Huff et al. [45] Mar. 29, 1983

[54] TORQUE CAM ASSEMBLY FOR VARIABLE SPEED DRIVE AND FOLLOWER ELEMENT THEREFOR

[75] Inventors: Robert O. Huff; Gebus Barnsfather, both of Columbus, Ind.

[73] Assignee: Reliance Electric Company, Columbus, Ind.

[21] Appl. No.: 225,648

[22] Filed: Jan. 16, 1981

[51] Int. Cl.³ ............................................. F16H 11/06
[52] U.S. Cl. ........................................ 474/19; 74/569; 192/93 A; 192/111 R
[58] Field of Search ........................ 474/19, 20, 21, 17, 474/12; 192/93 A, 93 R, 93 B, 93 C, 111 R, 111 A, 111 B, 111 T; 74/569

[56] References Cited

U.S. PATENT DOCUMENTS

| | | | |
|---|---|---|---|
| 1,810,360 | 6/1931 | Loeffler | 192/70.14 |
| 3,279,270 | 10/1966 | Pacak | 474/19 |
| 3,436,129 | 4/1969 | James | 308/239 |
| 3,616,706 | 11/1971 | Shimamoto | 474/19 |
| 3,841,949 | 10/1974 | Black | 161/42 |
| 4,216,678 | 8/1980 | Butterfield et al. | 474/12 |

Primary Examiner—Lawrence J. Staab
Assistant Examiner—Michael D. Bednarek
Attorney, Agent, or Firm—Marmaduke A. Hobbs

[57] ABSTRACT

A torque cam assembly for variable speed belt drives having a driven sheave with an axially slidable flange, in which a collar is mounted on the shaft of the sheave and has a plurality of cams thereon, and a cam follower structure having generally axially protruding members is mounted on the slidable flange of the sheave for cooperating with the cams on the collar. Wear elements are disposed on the members and are adapted to contact the cams on the collar. Two sets of cams may be used with the cams of one set facing in one direction and the cams of the other set facing in the opposite direction, and a pair of wear elements is provided on each of the members for engagement with the facing cams. Each wear element is provided with a distinct protrusion of a generally conical shape to provide the initial contact area with the respective cam surface, for creating substantially equal load sharing relationship between the various cams.

15 Claims, 6 Drawing Figures

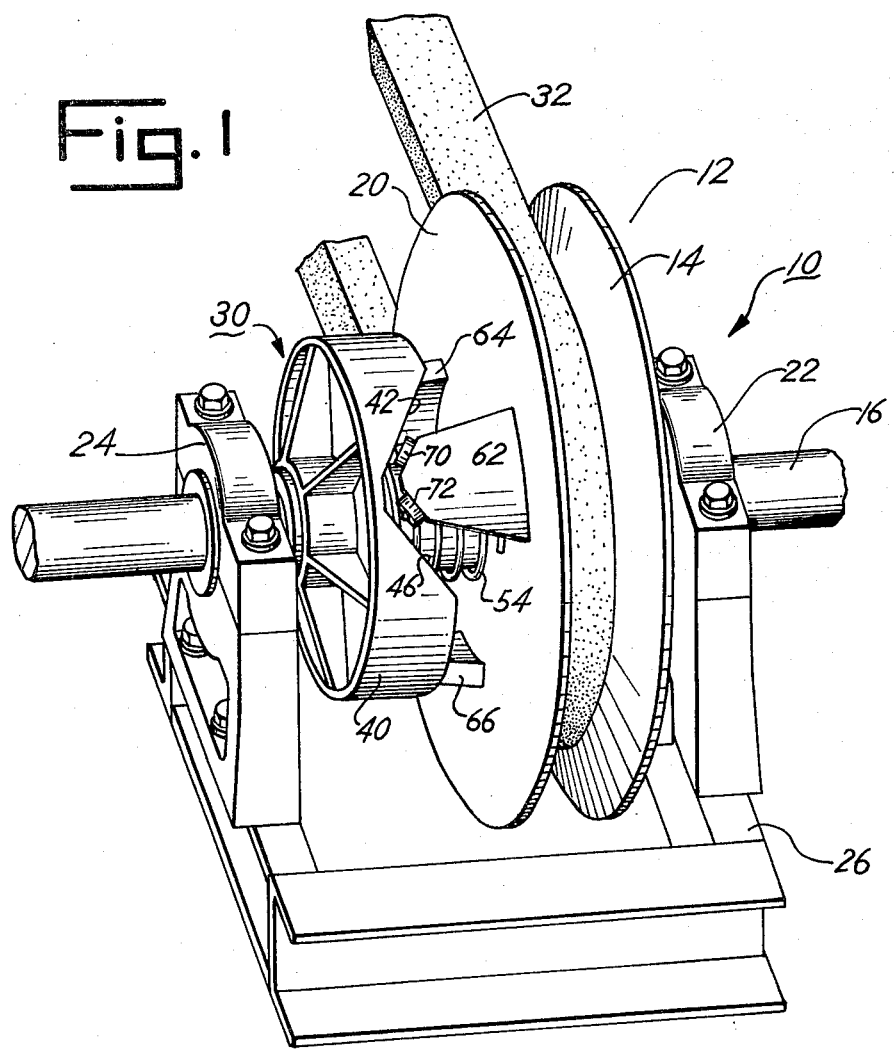
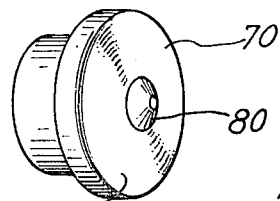
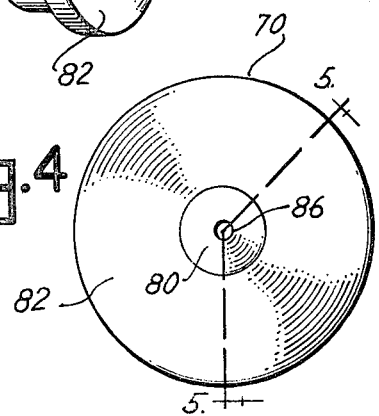
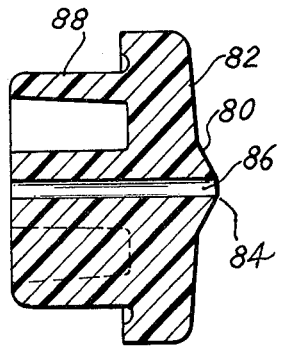
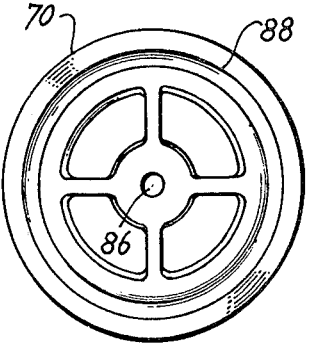

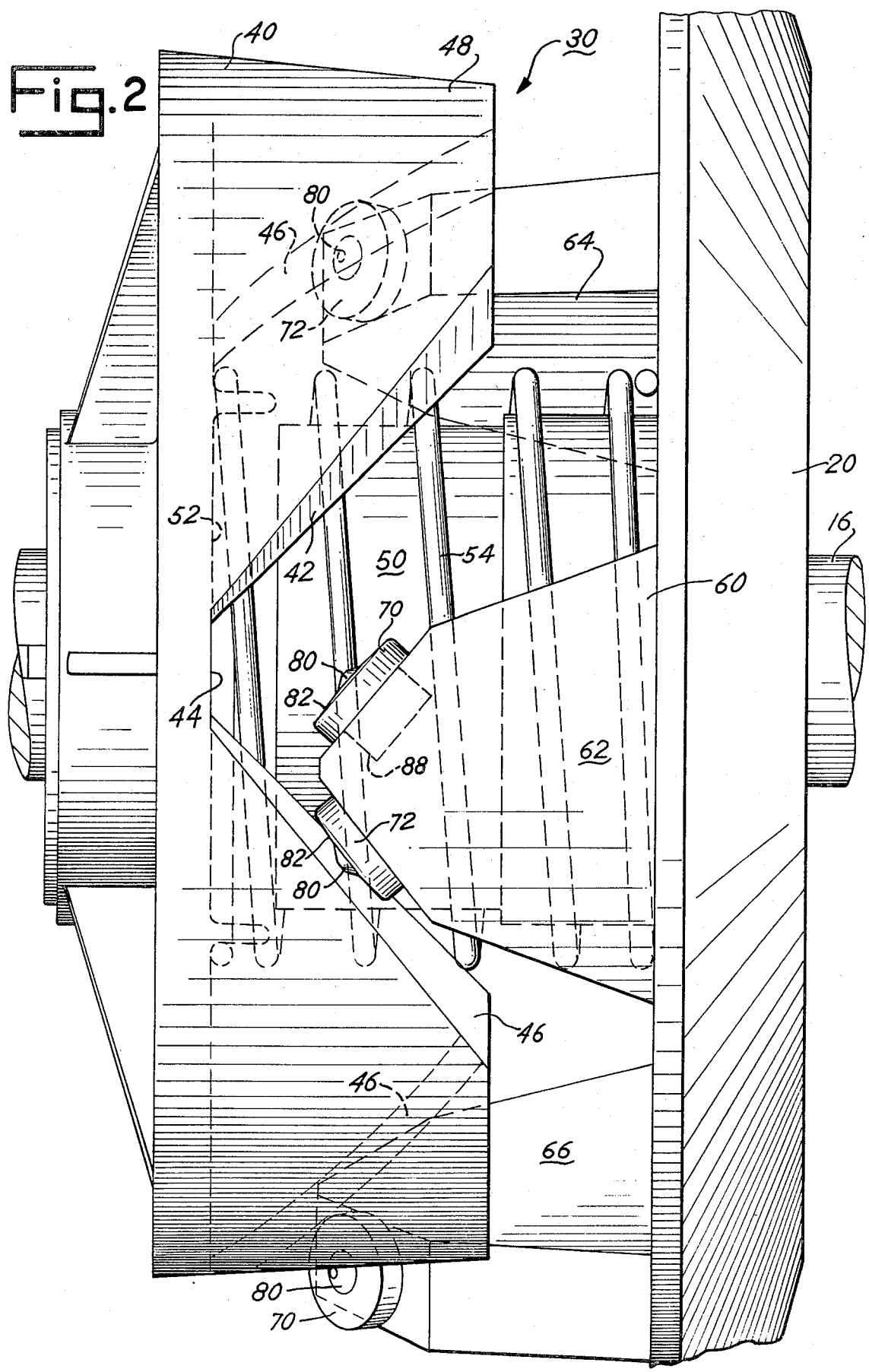

TORQUE CAM ASSEMBLY FOR VARIABLE SPEED DRIVE AND FOLLOWER ELEMENT THEREFOR

BACKGROUND OF THE INVENTION

In variable speed drives of the type having drive and driven sheaves interconnected by a belt, the drive sheave has an axially slidable flange movable to various selected positions relative to a fixed flange for varying the output speed of the drive, and the driven sheave has an axially slidable flange movable relative to the fixed flange in response to the increased or decreased force applied by the belt when the slidable flange of the drive sheave moves toward or away from the fixed sheave. While the slidable flange of the drive sheave is controlled either by a manually operated mechanism or by a power operated mechanism responsive to predetermined conditions, the slidable flange of the driven sheave is normally controlled either by a spring alone or by a torque cam assembly in which a spring may or may not be utilized. The spring alone merely resists the movement of the slidable flange away from the fixed flange and applies a force to urge the slidable flange toward the fixed flange, whereas the torque cam assembly responds to the load on the output of the drive to vary the force urging the slidable flange toward the movable flange and increases the resistance in response to an increase in the load. The torque cam assembly mechanism is normally preferred to the spring alone for the reason that it is directly responsive to the increase in torque resulting from an increase in the load on the output of the drive. This retains the belt tight and produces the required pressure of the belt on the flanges of the driven sheave for optimum power output for any given operating condition.

In the torque cam assembly type, three cams spaced around the shaft of the driven sheave are normally used in order to balance the forces around the shaft and thereby maintain optimum operation of the sheave for extended periods of time by preventing undue wear between the shaft and the sleeve or collar on which the cams are mounted. The use of multiple cams creates a problem, in that effective contact between the cam followers for the various cams is often not equal, thereby preventing equal load sharing on the cams and creating an imbalance of forces between the shaft and the cams, and a consequent increase in wear between the parts, as well as decreasing the response to changes in operating conditions.

SUMMARY OF THE INVENTION

The present invention relates to an improved torque cam assembly for variable speed belt drives, which effectively creates and maintains equal load sharing between a plurality of cams and cam followers, such that optimum operating performance is maintained for extended periods of time and wear of the related parts is minimized.

The torque cam assembly embodying the present invention includes the use of two or more cams and cam followers operatively disposed between the slidable flange and the shaft of the driven sheave, and wear elements are provided on the cam followers for adjusting or adapting the cam followers to the respective cams in response to the amount of pressure between the cam and element so that the load between the shaft and slidable flange is substantially equalized among all the cams and cam followers. Each of the wear elements has a protrusion which will transmit the forces between the cam and respective cam follower and yet will initially wear relatively fast to permit all the wear elements of the cam followers to seat firmly on their respective cams. After some wear has occurred on all the elements, the load is essentially equal on all the cams and the rate of wear of the elements decreases to the point where a relatively long operating life is obtained by the cam assembly and related parts, including the wear elements.

It is one of the principal objects of the present invention to provide a multiple cam torque assembly for variable speed drives, in which the load is shared evenly among the several cams, and in which any unequal load sharing condition is readily and automatically corrected during the initial operation of the drive.

Another object of the invention is to provide a torque cam assembly of the aforesaid type, which includes a dual set of cams and cam followers for operation of the drive in either direction, and which is easily produced without holding the cams and cam followers to close tolerances in order to achieve effective and equal load sharing among the various cams.

Still another object is to provide a cam follower element for variable speed belt drives, which is so constructed and designed that any initial unequal load sharing between the cams of a multiple cam torque assembly, is readily eliminated after the drive has been placed in operation.

Other objects and advantages of the present invention will become apparent from the following description and accompanying drawings.

BRIEF DESCRIPTION OF THE DRAWINGS

FIG. 1 is a perspective view of the driven pulley of a variable speed belt drive embodying the present invention;

FIG. 2 is an enlarged plan view of the torque cam assembly shown in FIG. 1;

FIG. 3 is a perspective view of a wear element used in the torque cam assembly shown in FIGS. 1 and 2;

FIG. 4 is an end elevational view of the wear element shown in FIG. 3;

FIG. 5 is a cross sectional view of the wear element, the section being taken on line 5—5 of FIG. 4; and FIG. 6 is an elevational view of the wear element, opposite the end shown in FIG. 4.

Referring more specifically to the drawings, numeral 10 indicates generally a driven sheave assembly of a variable speed belt drive consisting generally of a drive sheave and a driven sheave, the drive sheave having an input shaft connected to a motor or other suitable source of power, and the output shaft of the driven sheave being connected to the equipment to be driven thereby. The type of variable speed belt drive involving the present invention is fully disclosed in copending appliations Ser. No. 183,627, filed Sept. 2, 1980, and Ser. No. 191,316, filed Sept. 26, 1980 (common assignee with the present application). Since the present invention is concerned with the torque cam assembly of the driven pulley, the drive pulley and motor, such as those shown in the co-pending applications, are not shown herein. It is understood that the driven pulley shown in the present application operates in conjunction with a drive pulley similar to that shown in the co-pending applications, and with other suitable types of drive pulleys.

The sheave assembly 10 includes generally a sheave 12 having a fixed flange 14 secured to a shaft 16 and an axially slidable flange 20 mounted on shaft 16 and movable axially toward and away from flange 14 to vary the pitch of the sheave. The shaft is journaled in pillow blocks 22 and 24 which are mounted on a base frame 26, the frame normally being rigidly connected to the base frame of the drive sheave. The sheave assembly includes the present torque cam assembly 30 and is driven by the drive sheave through a belt 32 which engages the inner surfaces of flanges 14 and 20. The shaft 16 is shown extending outwardly from the sheave assembly at both ends to permit equipment to be driven from either end of the shaft.

The torque cam assembly 30, which transmits torque between flange 20 and shaft 16 and controls the pressure applied to the sides of the belt in response to changes in load, coinsists of a cam collar 40 having three cams 42 thereon equally spaced around the periphery of the collar and concentric with shaft 16. Cams 42 all face in the same direction and are disposed at the same angular position relative to base 44 of the collar. The collar also preferably includes three cams 46 spaced from but facing the respective cam 42. The second set of cams 46 permits the drive to be operated in either direction of rotation. The collar 40 is rigidly secured to the shaft, preferably by a key and bushing or set screw or any other suitable type of securing means, so that it rotates in unison with the shaft and remains axially fixed thereon. The collar includes side walls 48 which define an inner recess, with the walls being spaced outwardly from hub 50 of the slidable flange 20. Hub 50 which is cylindrical in shape is rigidly secured to flange 20, and is slidable on shaft 16 toward and away from inner end 52 of collar 40; hence, as slidable flange 20 moves to the left and right as seen in FIG. 2, the hub moves axially therewith along the shaft relative to collar 40. A coil spring 54 is disposed around hub 50 and reacts between the inner end 52 of the cam collar and the outer side of flange 20 to urge the flange toward the fixed flange. In the present cam assembly, the spring does not perform the usual function of the spring when the spring is used alone in the driven pulley of the conventional variable speed belt drives, of providing the total force required for controlling the flange. In the present cam assembly, the spring applies only a portion of the force and functions to eliminate any undesirable play in the parts between collar 40 and the slidable flange. A spring may be used which has a variable rate, calibrated to apply a force on flange 20 proportional to the load on the drive.

The cam follower structure, indicated generally by numeral 60, consists of three members 62, 64 and 66 attached to the outer side of flange 20 and extending parallel to the axis of the shaft and projecting into the slots formed by two facing cams 42 and 46. The outer end of each member contains wear elements 70 and 72 for engaging cams 42 and 46, respectively, depending upon which direction the drive is being driven. FIG. 1 shows the drive being driven in one direction with the wear element 70 seated on cam 42, and FIG. 2 shows the drive being driven in the opposite direction with wear element 72 seated on cam 46. In the torque cam assembly of the type illustrated in the drawings and involving the present invention, as the torque of the output shaft increases, there is a slight relative rotation between slidable flange 20 and collar 40, thus causing wear element 72 of FIG. 2 to move upwardly on cam 46, thereby urging flange 20 toward fixed flange 14 and applying a greater pressure on the sides of the belt 32 and maintaining the belt in a taut condition between the drive and driven sheaves. Except for the torque cam assembly, the flange 20 is free to rotate on shaft 16; however, the cam and cam follower relationship illustrated in the drawings transmits the torque between flange 20 and collar 40 which is rigidly secured to the shaft and rotates therewith.

In order to balance the forces equally around the shaft, three equally spaced cams 42 and 46 of the two sets of cams are used in conjunction with the respective cam followers 62; 64 and 66; however, in order to obtain full advantage of the plurality of spaced cams, each of the cam followers must seat firmly on the respective cam to transmit and distribute the forces equally to the three equally spaced cams 42 or the three equally spaced cams 46. Since machined cam followers require colse tolerances in order to obtain substantially equal load sharing among the three cams and respective cam followers, plastic wear elements have been tried. Although they tend to adapt themselves to any imbalance which may exist, the prior wear elements require a substantial amount of time to obtain equal load sharing and, as a result of uneven wear, they may never become worn effectively to provide full load sharing before replacement is required. In order to eliminate this disadvantage, wear elements 70 and 72 used in the present torque cam assembly include a protrusion 80 on the wear face 82, which is so shaped that it initially wears relatively rapidly, thereby producing an equal load sharing among the three cams within a relatively short period of time after the drive has been placed in operation or has been repaired by the replacement of the cam follower wear elements. In the embodiment illustrated in the drawings, the protrusion 80 is of a generally conical shape and the base of the protrusion is substantially smaller than wear face 82. While the protrusion is of a generally conical shape, it has a small blunt end 84 which renders the protrusion somewhat frustoconical in shape. This blunted structure is produced by a passage 86 extending axially through the center of the wear element from one end to the other and to the small end of the protrusion. The wear elements 70 and 72 are of a generally cylindrical shape and wear face 82 is generally disc shaped. Members 62, 64 and 66 are constructed of metal and contain holes for receiving shank 88 of the wear element, as can be seen in FIG. 2 of the drawings. A wear element is preferably of a plastic material such as acetal resin, and a suitable brand for the material from which the elements are made is available in the trade under the name "Delrin". Various other suitable materials may be used, although a plastic material will produce the type of wear desired on the wear elements for producing the proper load sharing among the cams without producing any excess wear on the cams.

In the operation of the driven pulley 10 embodying the present torque cam assembly, the drive pulley drives the driven pulley through belt 32 and the force transmitted by the belt is transmitted to flanges 14 and 20, which in turn transmit the torque to shaft 16, flange 14 being secured firmly and preferably keyed to shaft 16, and flange 20 being prevented from rotating to any substantial angular degree by the relationship between the cam followers 62, 64 and 66 and the three cams 42 or the three cams 46 on collar 40. Collar 40 is secured rigidly to the shaft while flange 20, except for the torque cam assembly, is otherwise free to rotate relative to the shaft. In the event the load is increased on the output shaft while the driven sheave is rotating in the counterclockwise direction as viewed in FIG. 1, element 70 travels upwardly on cam 42, thereby causing the slidable flange 20 to move toward flange 14 sufficiently to cause the two flanges to apply a firm force against the sides of belt 32 and to maintain the belt in a taut condition in relation to the drive and driven sheaves. When the torque load is relieved on the output shaft, the force applied to the sides of the belt by the two flanges causes cam follower 70 to move downwardly on cam 42, thereby relieving some of the pressure applied to the sides of the belt, but not sufficiently to prevent the belt from remaining taut and in firm contact with the flanges.

In order to obtain substantially equal load sharing between elements 70 and cams 42 or elements 72 and cams 46, depending upon the direction which the driven pulley is rotating, the protrusion 80 of elements 70 engage the surface of the cams and initially wear relatively fast, in view of the fact that the conical shape applies only a relatively small area against the cam surface. As wear of the protrusion takes place, the area of the end of the protrusion increases, thus retarding the rate of wear of the protrusion; however, by the time a small amount of wear has taken place, the protrusions on the three elements 70 or on the three elements 72 are seated firmly on the respective cams. As the drive continues to operate, wear gradually continues at a progressively slower rate so that at least some portion of the protrusion will normally remain on the wear element. However, under extreme conditions, the protrusions may be completely removed after a long period of operation of the drive, and, in that event, substantially the full wear face 82 comes in contact with the respective cam.

It is seen from the foregoing description that effective load sharing is obtained between the various cams by the use of the present wear element, and this equal load sharing is maintained notwithstanding the fact that the rate of wear diminishes as further wear of the protrusions occurs. The protrusion on the wear element has been shown and described as being conical or frustoconical in shape; however, other shapes which taper from a relatively large base to a relatively small tip disposed on wear face 82, may be used in place of the conical configuration. While only three cams 42 and 46 in each set are disclosed, other suitable numbers may be used so long as they are equally spaced around shaft 16.

While only one embodiment of the present torque cam assembly for variable speed drives and follower element therefor has been described in detail herein, various changes and modifications may be made without departing from the scope of the invention.

We claim:

1. A torque cam assembly for variable speed belt drives having a driven sheave with an axially slidable flange mounted on a shaft, comprising a first support means mounted on the shaft, second support means connected to said slidable flange, a plurality of spaced cams disposed on one of said means and arranged around the axis of the shaft, a plurality of spaced cam followers disposed on the other of said means for cooperation with said cams, and wear elements on said cam followers for engagement with said cams, each of said wear elements having a wear face with a distinct protrusion thereon to provide the initial contact area with the cam surface for creating a substantially equal load sharing relationship between the plurality of cams.

2. A torque cam assembly for variable speed belt drives as defined in claim 1 in which said first support means mounted on said shaft consists of a collar-like structure on which said spaced cams are disposed, and said second support means consists of a structure connected to said slidable flange.

3. A torque cam assembly for variable speed belt drives as defined in claim 2 in which said second support means consists of a plurality of members spaced around the outer face of said slidable flange and having said wear elements mounted thereon for engagement with the cams.

4. A torque cam assembly for variable speed belt drives as defined in claim 1 in which said plurality of spaced cams face in one direction and a second plurality of spaced cams face in the opposite direction for operation of the drive in either direction.

5. A torque cam assembly for variable speed belt drives as defined in claim 4 in which said first and second mentioned plurality of cams are mounted on a collar disposed axially on said shaft, and members with said wear elements are connected to said slidable flange and project into spaces between pairs of oppositely facing spaced cams.

6. A torque cam assembly for variable speed belt drives as defined in claim 5 in which a pair of wear elements is provided on each of said members for engaging the oppositely facing cams.

7. A torque cam assembly for variable speed belt drives as defined in claim 6 in which each set of plurality of spaced cams consists of three cams, and three members with cam followers thereon are connected to said slidable flange and project into the spaces between the oppositely facing cams.

8. A torque cam assembly for variable speed belt drives as defined in claim 1 in which said wear face is generally disc shaped and said protrusion extends outwardly from the center thereof and is generally conical in shape.

9. A torque cam assembly for variable speed belt drives as defined in claim 7 in which said wear face is generally disc shaped and said protrusion extends outwardly from the center and is generally conical in shape.

10. A torque cam assembly for variable speed belt drives as defined in claim 1 in which said protrusion is of a generally conical shape and the base thereof is substantially smaller than said wear face.

11. A torque cam assembly for variable speed belt drives as defined in claim 1 in which said wear elements are cylindrical in shape and said protrusion is of a generally conical shape, and the base of the protrusion is substantially smaller in diameter than said wear face.

12. A torque cam assembly for variable speed belt drives as defined in claim 1 in which a spring means is disposed between said first support means and said slidable flange for urging said flange in the direction to increase the pitch of said driven sheave.

13. A torque cam assembly for variable speed belt drives as defined in claim 1 in which the wear face and protrusion of said element are constructed of plastic material.

14. A torque cam assembly for variable speed belt drives as defined in claim 11 in which the wear face and protrusion of said elements are constructed of plastic material.

15. A torque cam assembly for variable speed drives as defined in claim 12 in which said spring is of a variable rate type.

* * * * *